(12) United States Patent
Siraj (10) Patent No.: US 7,076,572 B1
(45) Date of Patent: Jul. 11, 2006

(54) COMMUNICATION MEMORY FOR RECEIVING CONTROL INFORMATION SEQUENTIALLY AND IN PARALLEL FORM FOR TEMPORARY STORAGE AND BROADCASTING ON PARALLEL BUS

(76) Inventor: Aimal Siraj, 1-14-3-202, Kakinokizaka, Meguro-ku, Tokyo 152-0022 (JP)

( * ) Notice: Subject to any disclaimer, the term of this patent is extended or adjusted under 35 U.S.C. 154(b) by 0 days.

(21) Appl. No.: 09/601,192

(22) PCT Filed: Nov. 30, 1999

(86) PCT No.: PCT/JP99/06704

§ 371 (c)(1),
(2), (4) Date: Jul. 28, 2000

(87) PCT Pub. No.: WO00/33539

PCT Pub. Date: Jun. 8, 2000

(30) Foreign Application Priority Data

Nov. 30, 1998 (JP) ................................ 10-340599

(51) Int. Cl.
   *G06F 13/00* (2006.01)
   *G06F 3/00* (2006.01)
(52) U.S. Cl. .............................. 710/11; 710/8; 710/10; 710/104; 710/105; 709/230; 370/465; 370/469
(58) Field of Classification Search .................... 710/8, 710/10, 11, 104, 105; 709/230; 370/469, 370/465
   See application file for complete search history.

(56) References Cited

U.S. PATENT DOCUMENTS

| | | |
|---|---|---|
| 5,754,552 A | 5/1998 | Almond et al. |
| 5,802,065 A | 9/1998 | Ogawa et al. |
| 5,832,215 A * | 11/1998 | Kato et al. .................. 709/230 |
| 6,230,225 B1 * | 5/2001 | Olarig et al. ............... 710/306 |
| 6,275,869 B1 * | 8/2001 | Sieffert et al. .............. 709/321 |
| 6,505,347 B1 * | 1/2003 | Kaneko et al. ............... 725/39 |
| 2002/0035630 A1* | 3/2002 | Stumer ....................... 709/227 |

FOREIGN PATENT DOCUMENTS

| | | |
|---|---|---|
| EP | 0 421 779 A | 4/1991 |
| EP | 0 588 423 A | 3/1994 |

OTHER PUBLICATIONS

Robert Bosch, CAN Specification Version 2.0, 1991.*

* cited by examiner

*Primary Examiner*—Tammara Peyton
(74) *Attorney, Agent, or Firm*—Diller, Ramik & Wight (57) ABSTRACT

A design of a flexible communication device capable of reducing time and labor required for changing a communication protocol and positively eliminating an erroneous operation, and interface devices for the communication device. A communication device (1) receives from a control device (2) control information corresponding to address spaces of the control device (2) for loading into a memory (7) sequentially. A command acquisition unit (8) sequentially reads control information stored in the memory (7), and sends them to individual detection units (9-1 to 9-*m*) via a back-end bus (12). Each detection unit detects whether or not the control information match each communication protocol module corresponding to each detection unit and sends matching control information, if any, to an own communication protocol module for communication protocol processing. A communication protocol management unit (11) manages and processes, via a bus (13), data moving through connection media between communication network interfaces (6-1 to 6-*n*) and respectively corresponding communication terminals (3-1 to 3-*n*).

13 Claims, 10 Drawing Sheets

COMMAND SPACE

| | | |
|---|---|---|
| BASE+0 | 1 00 00010 | CB(0) } DEACTIVATION |
| BASE+1 | 100 0000 0 | DB(0) } OF VIDEO I/F |
| BASE+2 | 0 00 00011 | CB(1) } LOOPBACK OF AUDIO |
| BASE+3 | 011 0000 1 | DB(1) } I/F AND DATA I/F |

FIG. 7(b)

COMMAND SPACE

| | | |
|---|---|---|
| BASE+0 | 1 00 00001 | CB(0) } DEACTIVATION OF OPTICAL |
| BASE+1 | 0000000 0 | DB(0) } COMMUNICATION I/F |
| BASE+2 | 0 01 00100 | CB(1) } SET-UP OF BANDWIDTH |
| BASE+3 | VIRTUAL ADDRESS (α) | DB(1) } TO BE USED |

DATA SPACE

| | | |
|---|---|---|
| BASE+ | 0000 0011 | DATA LENGTH = 3 BYTES |
| BASE+1 | 0001 0101 | AUDIO BANDWIDTH = 15% |
| BASE+1+1 | 0101 0000 | DATA BANDWIDTH = 50% |
| BASE+1+2 | 0011 0101 | VIDEO BANDWIDTH = 35% |
| 1+3 | | |

COMMUNICATION MEMORY FOR RECEIVING CONTROL INFORMATION SEQUENTIALLY AND IN PARALLEL FORM FOR TEMPORARY STORAGE AND BROADCASTING ON PARALLEL BUS

TECHNICAL FIELD

This invention relates to a communication system which has a certain control device, one or more communication terminals, and a communication device which connects the control device with the communication terminals and has one or more communication protocol modules which control the one or more communication terminals based on control information from the control device, and more particularly to a communication system which can remarkably reduce time and labor necessary for changes to the communication device design based on modifications to the communication protocol itself.

BACKGROUND ART

There exist communication systems with a communication device which connects a certain control device with one or more communication terminals, and controls the one or more communication terminals based on control information from the control device.

Figure 9:
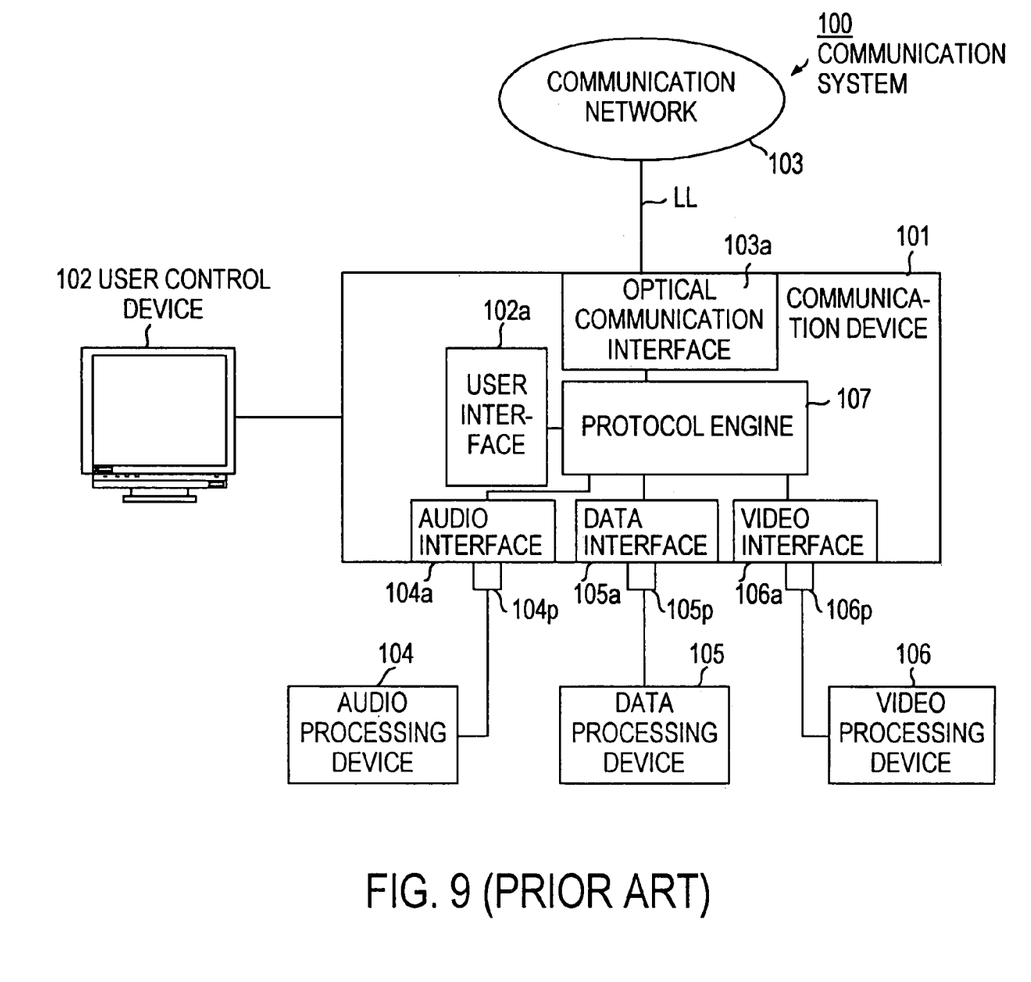
FIG. 9 illustrates an example of a communication system including a communication device.

For example, FIG. 9 shows a structure of a communication system including a communication device. A communication device 101 in a communication system 100 connects with a user control device 102, a communication network 103, an audio processing device 104 such as a telephone set, a data processing device 105 such as a router, and a video processing device 106 through a user interface 102a, an optical communication interface 103a, an audio interface 104a, a data interface 105a, and a video interface 106a, respectively. The optical communication interface 103a connects with the communication network 103 via an optical fiber LL to implement high-speed communication. A port 104p of the audio interface 104a connects with the audio processing device 104 through a two-wire telephone line to implement transmission and reception of audio information. A port 105p of the data interface 105a connects with the data processing device 105 such as a LAN router, for instance, through a twisted pair cable (UTP-5) of the 10 BASE standard (IEEE802.3), to implement transmission and reception of data. A port 106p of the video interface 106a connects with the video processing device 106 via a coaxial cable, to implement transmission and reception of video information. The user control device 102 connects with the user interface 102a via a cable corresponding to the user interface 102a, i.e., a serial transfer cable such as an RS232C interface cable, for instance, to provide control information from the user control device 102 to the communication device 101 as an input.

The communication device 101 contains a communication protocol engine 107 which has a communication protocol to multiplex and demultiplex information such as audio, data, and video for the communication network 103. This communication protocol converts analog telephone signals into digital signals, or converts digital signals into analog telephone signals. This conversion processing includes, for instance, ring indication, off hook detection, dialing, and audio digitalization. This communication protocol also converts analog video signals into digital video signals, or converts digital video signals into analog video signals. Moreover, it multiplexes and sends information received from the audio processing device 104, the data processing device 105, and the video processing device 106 to the optical fiber LL. Conversely, it demultiplexes information received from the optical fiber LL. It sends information through the optical fiber LL to the communication network 103, and receives information from the communication network 103 through the optical fiber LL.

The user control device 102' sends control information to the communication protocol engine through the user interface 102a, and controls communication among the communication network 103, the audio processing device 104, the data processing device 105, and the video processing device 106. For example, it can control the activation or deactivation of the optical communication interface 103a, the audio interface 104a, the data interface 105a, and the video interface 106a, the loopback processing of all interfaces 104a to 106a, and setting of bandwidth used for audio, data, and video on the optical fiber LL.

Figure 10:
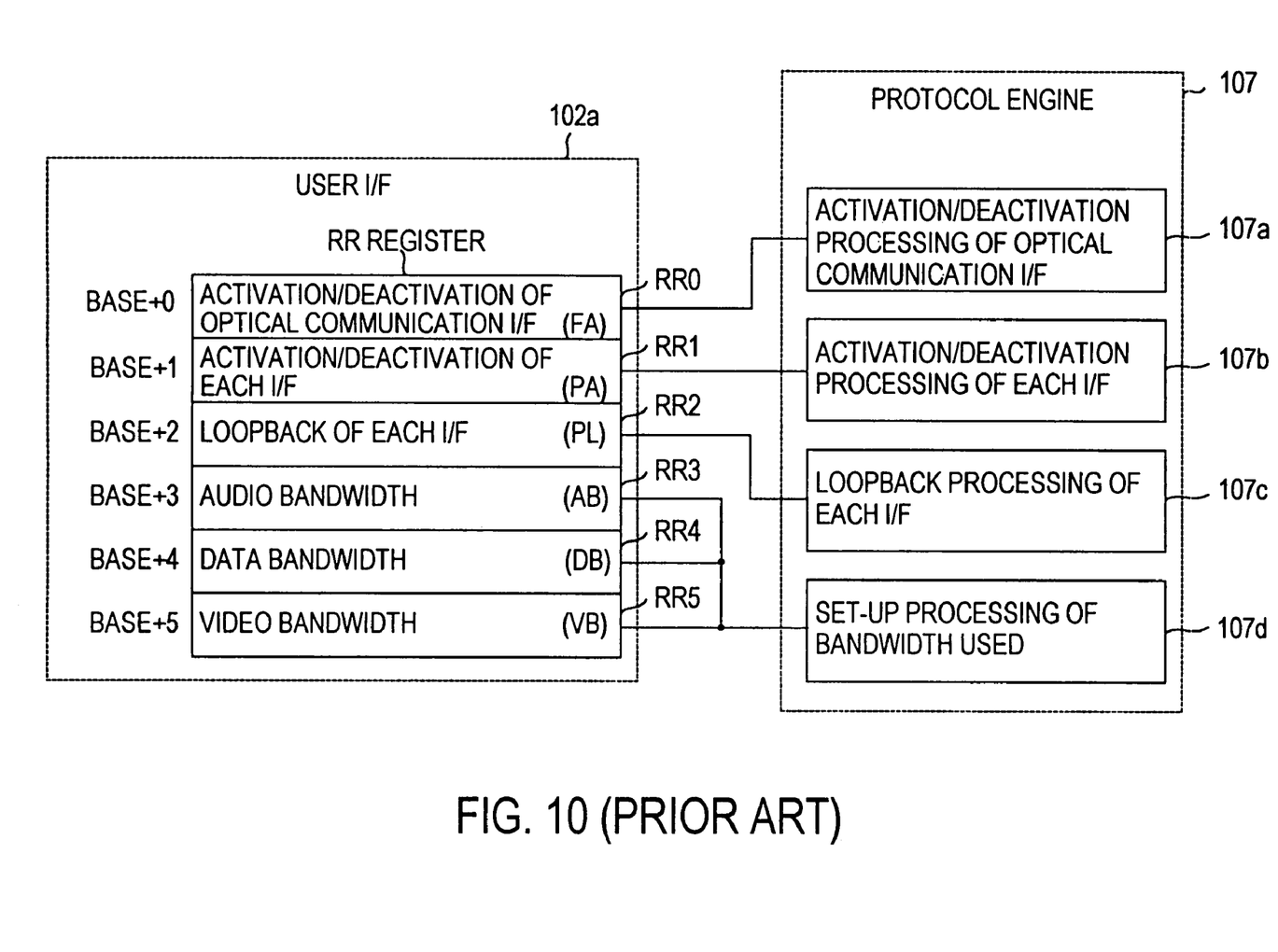
FIG. 10 depicts a relationship between registers and communication protocol implementation blocks in a conventional communication device.

More concretely, as described in FIG. 10, contents of registers RR in the user interface 102a correspond to communication protocol modules 107a to 107d in the communication protocol engine 107. Control information FA which controls the activation or deactivation of the optical communication interface 103a is stored in a register RR0 corresponding to an address BASE+0 viewed from the user control device's 102 side. The communication protocol module 107a always reads control information stored in the register RR0, and based on this information it controls activation or deactivation of the optical communication interface 103a. Therefore, the control information FA is always stored in the register RR0; the user control device 102 sends the control information FA by designating the address BASE+0 corresponding to the register RR0; the communication protocol module 107a acquires the control information FA from the register RR0. Similarly, control information PA which controls the activation or deactivation of each of the interfaces 104a to 106a is always stored in a register RR1; the user control device 102 stores the control information PA by designating an address BASE+1 corresponding to the register RR1; the communication protocol module 107b acquires the control information PA from the register RR1 and controls the activation or deactivation of each of interfaces 104a to 106a. Moreover, control information PL for loopback processing of each of the interfaces 104a to 106a, control information AB for audio bandwidth, control information DB for data bandwidth, and control information VB for video bandwidth are always stored in registers RR2 to RR5, respectively; the user control device 102 stores control information PL, AB, DB and VB by designating addresses BASE+2 to BASE+5 corresponding to the registers RR2 to RR5; the communication protocol module 107c acquires the control information PL from the register RR2 and controls the loopback processing; the communication protocol module 107d acquires the control information AB, DB and VB from the registers RR3 to RR5 and controls the set-up processing of bandwidth used for audio, data and video. This communication protocol 107d corresponds to three registers RR3 to RR5, because the bandwidth set-up cannot fit into one register as a unit of information containable by each register RR is fixed. However, the control information stored in the registers RR3 to RR5 are fixed.

In the above mentioned conventional communication system 100, since all control information is stored in the fixed space of registers RR, if the communication protocol is modified, additional registers which store control information for this modification need to be assigned and due to this addition of registers, in some cases the position of the registers already assigned for the storage of control information needs to be changed.

If the positions of these existing registers are changed, the user control device 102 needs to change register-position indicating addresses for all control information that it sends, thus the user control device 102's address space for accessing control information will have to be modified which requires a complicated operation and causes problems.

Moreover, in the implementation of communication protocol (FIG. 10), since the position of the registers which acquire control information is changed, the position of registers for the implementation of the existing communication protocol also has to be changed. Especially, when the communication protocol is complicated, a lot of time needs to be spent for such modifications, a lot of time and labor are also required for debugging since it is difficult to organize the relative positions of registers, which sacrifices time and labor required for the implementation of the communication protocol and causes problems.

Figure 11:
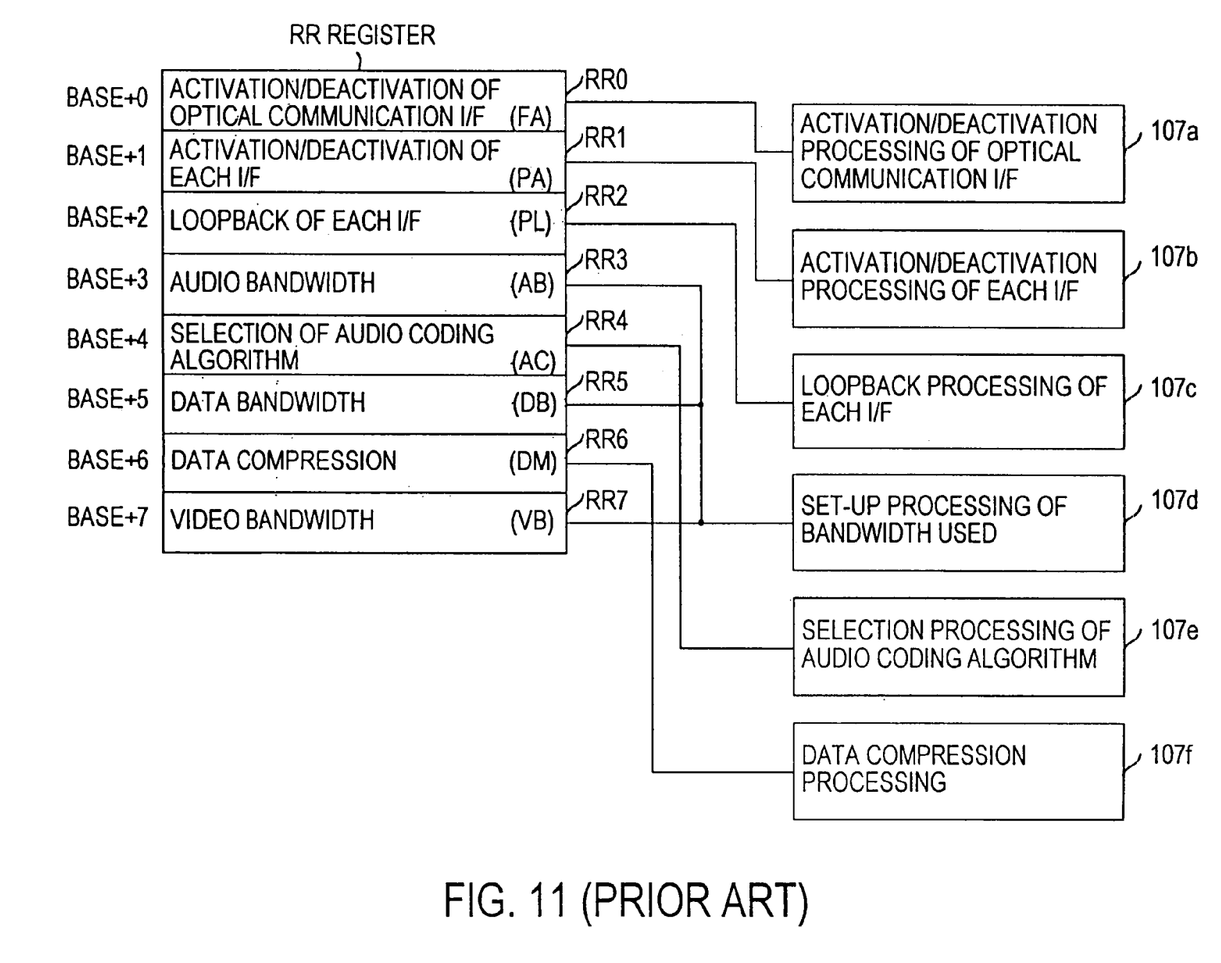
FIG. 11 shows a structure of the conventional communication device in FIG. 10 after its design is changed.

For example, FIG. 11 illustrates the main structure of a communication device which is formed by adding two communication functions (implemented by 107*e* and 107*f*) to the structure of the communication device described in FIG. 10. The block 107*e* added in FIG. 11 is a block for selection processing of the audio coding algorithm using control information AC. The block 107*f* is a block for compression processing of data using control information DM. In this case, since the selection of audio coding algorithm deals with audio data, the control information AC should be placed in a register close to the control information AB which sets up audio bandwidth; and since the compression of data deals with data, the control information DM should be placed in a register close to the control information DB which sets up data bandwidth. Therefore, the control information AC and the control information DM are inserted into the register RR4 and the register RR6 respectively. As a result, the control information DB which was placed in the register RR4 is moved to the register RR5, and the control information VB which was placed in the register RR5 is moved to the register RR7. Thus due to the changes in registers the control device 102's addresses also need to be modified. Moreover, among the already set up blocks 107*a* to 107*d*, 107*d* need to be modified; the register RR4 shifted to the register RR5, and the register RR5 shifted to the register RR7. Thus changes to the communication protocol triggers the following major modifications: modifications to the positions of the registers, modifications to the user control device 102's addresses, and modifications to the routing between the other implementation blocks and the registers.

Moreover, when changes to the communication protocol are implemented, mistaken routing between the implementation blocks and the registers causes the implementation blocks to acquire irrelevant control information, thus causing malfunction and causes big problems.

On the other hand, due to rapid technological advances recently, the development cycle of communication devices has shortened, and the design modification cycle has also shortened, there is a continuous demand for a reduction in time and labor spent on design changes.

DISCLOSURE OF THE INVENTION

This invention solves the above mentioned problems, reduces the time and labor necessary for design changes such as adding or deleting communication protocol modules, thoroughly eliminates malfunctionality, and provides a communication system with a flexible communication device.

In order to achieve the above mentioned objectives, the first invention is a communication system comprising a control device, one or more communication terminals, and a communication device which connects the control device with the one or more communication terminals, and has one or more communication protocol modules for controlling communications of the one or more communication terminals based on control information from the control device, characterized in that the communication device includes: a memory which temporarily stores the control information sent from the control device, sequentially; control information acquisition means which sequentially acquires the control information temporarily stored in the memory and broadcasts it to the one or more communication protocol modules; and one or more detection means each being provided in correspondence with each of the one or more communication protocol modules at a front stage on an input side of each of the communication protocol modules, for detecting whether the control information broadcasted by the control information acquisition means needs to be processed by each of the one or more communication protocol modules, and that the one or more communication protocol modules implement processing of the control information if a corresponding one or more detection means detect that the control information is meant to be processed by an own communication protocol module.

In the first invention, the position of the control information in the memory is not fixed; the control information acquisition means reads the control information from the memory and broadcasts it to each of the detection means; only if one or more detection means detect that the control information should be processed by its corresponding communication protocol module, each of such detection means sends the necessary information needed by its communication protocol module to it, thus each of the communication protocol modules implements processes, and so the communication device design can be modified by just the addition or deletion of communication protocol modules.

Since the communication device design can be changed by just adding or deleting communication protocol modules, the time and labor necessary for changes to design can be significantly reduced.

Moreover, addresses of the control information in the control device don't need to correspond to memory locations in the communication device; there is no need to change the control device design in accordance with changes to the implemented design of the protocol to realize modifications to the communication protocol.

Since each of the communication protocol modules is designed to do communication protocol processing irrelevant to the memory space, there is no need to modify the design of the communication protocol modules such as address changes, as a result of the addition or deletion of communication protocol modules.

The second invention is characterized in that, in the first invention, the control information acquisition means and the one or more detection means corresponding to the one or more communication protocol modules are connected through a bus.

In the second invention, the control information acquisition means broadcasts the control information through a bus; one or more detection means placed at the front stage of each of the communication protocol modules only detect control information meant for their corresponding communication protocol modules, thus wrong control information will not be input to any of the communication protocol modules, preventing malfunctions and breakdowns.

The third invention is characterized in that, in the first and the second inventions, each of the one or more communication protocol modules is constituted for each of the processing categories of the control information.

In the third invention, since the control information corresponds to one or more communication protocol modules, when adding or deleting communication protocol processes, the communication device design can be changed by just adding or deleting the corresponding communication protocol module or modules.

The fourth invention is characterized in that, in the first to third inventions, the memory has a control space for temporarily storing control information from the control device to the one or more protocol modules and a status space for temporarily storing status information from the one or more protocol modules to the control device, and that the control device writes control information into the control space of the memory and reads status information from the status space of the memory.

In the fourth invention, bi-directional communication can be achieved by sending control information and receiving status information through the memory, thus operability for communication device's processing by the control device can be improved.

The fifth invention is characterized in that, in the fourth invention, the control information written to the control space is comprised of a command number and command data; and that the control device temporarily stores at least a pair of the command number and the command data into the memory sequentially.

In the fifth invention, the command number and command data are stored into the memory separately, each detection means can judge quickly whether the control information is related to its communication protocol module based on the command number.

The sixth invention is characterized in that, in the fifth invention, the control space is comprised of a command space which consists of pairs of the command number and the command data both made up of a fixed unit of information and a data space for temporarily storing the command data if the command data exceeds the fixed unit of information; and that the control device writes information corresponding to an address within the data space where the command data is temporarily stored, instead of the command data that pairs with the command number, and also writes to a head of the command data stored in the data space information corresponding to a data length, in the fixed unit of information, in which a content of the command data is temporarily stored.

In the sixth invention, basically search of control information can be conducted quickly since pairs of command number and command data made up of fixed unit of information are stored in the memory in principle.

The seventh invention is characterized in that, in the sixth invention, the information which corresponds to the address written in the fixed units of information and the information which corresponds to the data length, both are a virtual address or a virtual data length formed by shifting values by a fixed amount; and that the control device processes the virtual address or the virtual data length both as reverse shifted by a fixed amount.

In the seventh invention since a virtual address and a virtual data length are employed, even though a fixed unit of information is used, large addresses and large data lengths can be handled, thus a flexible system can be built, since it can maintain a fixed unit of information, fast retrieval of control information also becomes possible.

BRIEF DESCRIPTION OF THE DRAWINGS

FIGS. 7(*a*) and 7(*b*) depict actual contents of data in the command space and the data space;

BEST MODE FOR CARRYNG OUT THE INVENTION

Figure 1:
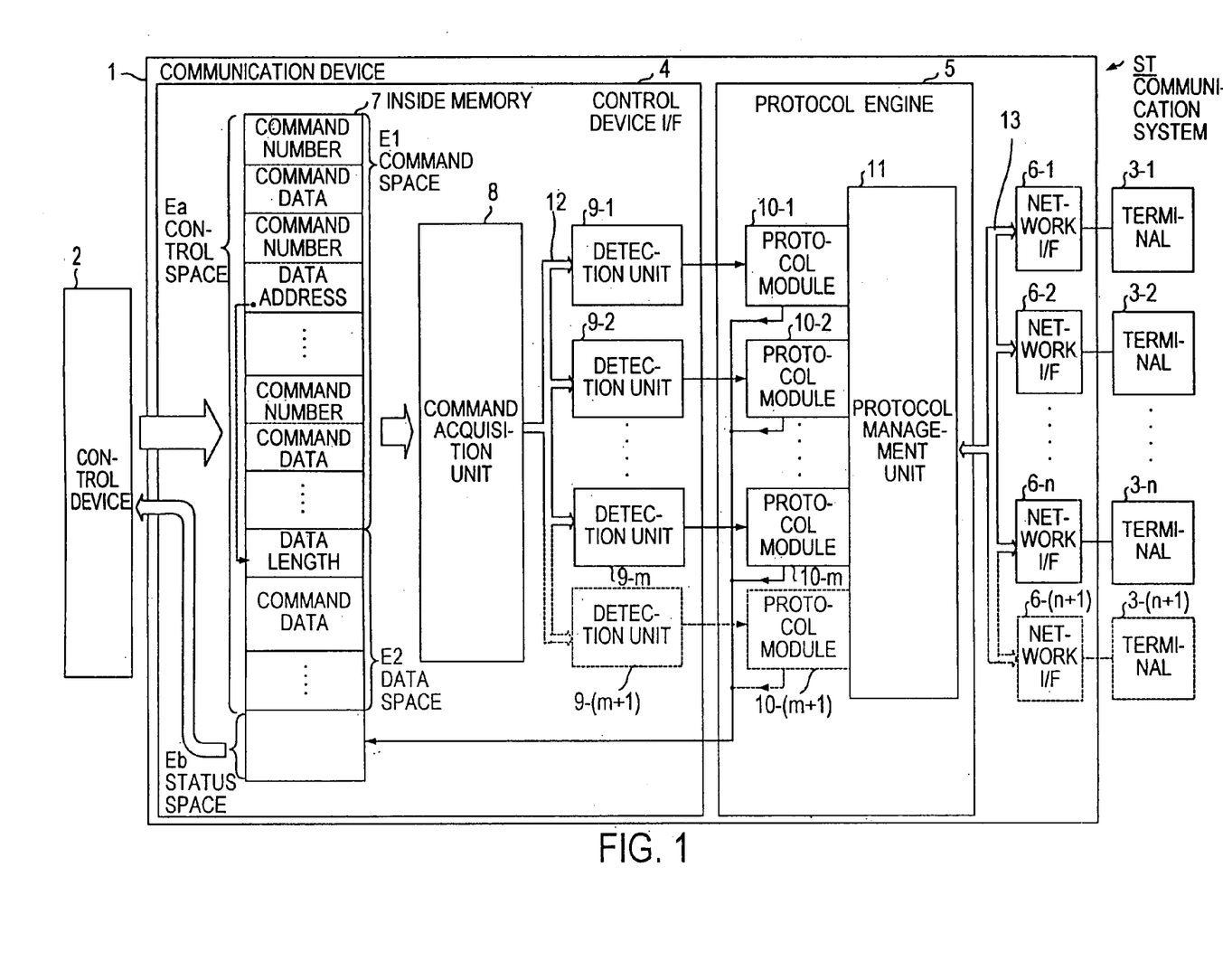
FIG. 1 shows a block diagram of a rough structure of an embodiment of a communication system of the invention.

The following explains preferred embodiments of this invention by referring to figures:

FIG. 1 shows a block diagram of an embodiment of a communication system of this invention. In FIG. 1 a control device 2 is connected to a communication device 1 through which it controls multiple communication terminals 3-1 to 3-*n* which are connected to the communication device 1. And the connection between the communication terminals 3-1 to 3-*n* and the communication device 1 constitutes a communication network.

The communication device 1 is mainly composed of a control device interface 4, a communication protocol engine 5, and communication network interfaces 6-1 to 6-*n*.

The control device interface 4 comprises a memory 7, a command acquisition unit 8 and multiple detection units 9-1 to 9-*m*. The control device 2 writes control information sent out by it to the memory 7 and reads status information from the memory 7. Logically a control space Ea to store the control information and a status space Eb to store the status information coexist inside the memory 7. And the control space Ea has two areas, namely a command space E1 and a data space E2. The command space E1 comprises pairs made up of command numbers and command data, which are stored sequentially via access from the control device 2. In case the command data cannot fit in memory 7 widthwise, this command data stores data address information of the data space E2 that stores the command data that could not be expressed in the memory 7 width-wise, and it serves as a pointer. In other words, only when the command data is larger than the width of the memory 7, the data space E2 is used. The structure of the status space Eb is fixed and informs the control device of execution results of each command from the communication protocol. The detailed structure of the memory 7 is explained later.

The command acquisition unit 8 and the multiple detection units 9-1 to 9-$m$ are connected with a back-end bus 12. Each detection unit 9-1 to 9-$m$ corresponds respectively to each of multiple communication protocol modules 10-1 to 10-$m$ inside the communication protocol engine 5 which perform communication processing corresponding to each command; and each detection unit 9-1 to 9-$m$ and each communication protocol module are connected individually.

The command acquisition unit 8 automatically retrieves the control information temporarily stored in the memory 7 and broadcasts the retrieved control information to each detection unit 9-1 to 9-$m$ through the back-end bus 12. Each detection unit 9-1 to 9-$m$ receives the control information broadcasted through the back-end bus 12, decodes the command number, detects if the decoded result is meant for a communication protocol module corresponding to own detection unit, and sends out this control information to own communication protocol module only if this control information is meant for the communication protocol module that corresponds to own detection unit. On the other hand, each detection unit 9-1 to 9-$m$ ignores the control information if the decoded result is not meant for the communication protocol module that corresponds to own detection unit.

The communication protocol engine 5 comprises the multiple communication protocol modules 10-1 to 10-$m$ and a communication protocol management unit 11 which controls the communication protocol modules 10-1 to 10-$m$. As stated above each communication protocol module 10-1 to 10-$m$ performs command processing according to command number. Therefore, each communication protocol module 10-1 to 10-$m$ does not necessarily perform processing corresponding to a specific communication terminal 3-1 to 3-$n$. Each communication protocol module 10-1 to 10-$m$ receives control information or information necessary for processing of own communication protocol module, for instance command data, from the detection unit 9-1 to 9-$m$ connected in correspondence with own communication protocol module, and carries out predetermined communication protocol processing. Thus, each communication protocol module 10-1 to 10-$m$ can carry out communication protocol processing irrespective of where control information which corresponds to it is stored in the memory. Depending on the result of communication protocol processing the communication protocol management unit 11 by means of Bus 13 manages and processes data which flows through the connection media located in-between the communication network interfaces 6-1 to 6-$n$ and the communication terminals 3-1 to 3-$n$ corresponding respectively to each one of these interfaces.

In this way, in the communication device 1 described in FIG. 1, the control information stored in the memory 7 is not stored in fixed locations but stored sequentially in the order in which it is sent from the control device 2. Thus for example, if new communication control processing becomes necessary due to connecting new communication terminal 3-($n$+1) to the communication device 1, the communication terminal 3-($n$+1) can be controlled just by adding a new communication network interface 6-($n$+1), a new communication protocol module 10-($m$+1) corresponding to the new control information, and detection unit 9-($m$+1); regardless of the location of this new control information in memory. The control device 2 on the other hand just needs to send new control information to the communication device 1 and in spite of addition of new control data, is not required to change the address of other control information necessitated by a change in memory locations.

The communication protocol module 10-($m$+1) does not require any information regarding the location of new control information in the memory 7, other communication protocol modules 10-1 to 10-$m$ never had any information regarding memory 7's locations from the beginning; thus adjustment to the memory locations caused by adding the new communication protocol module 10-($m$+1) is not necessary.

Furthermore, the same procedure as outlined above is followed when adding new control information i.e. command pertaining to the existing communication terminals 3-1 to 3-$n$ without the addition of a new communication terminal 3-($n$+1). In such a case, the only thing required is to add a detection unit 9-($m$+1) corresponding to the command and a communication protocol module 10-($m$+1) which processes this command.

Figure 2:
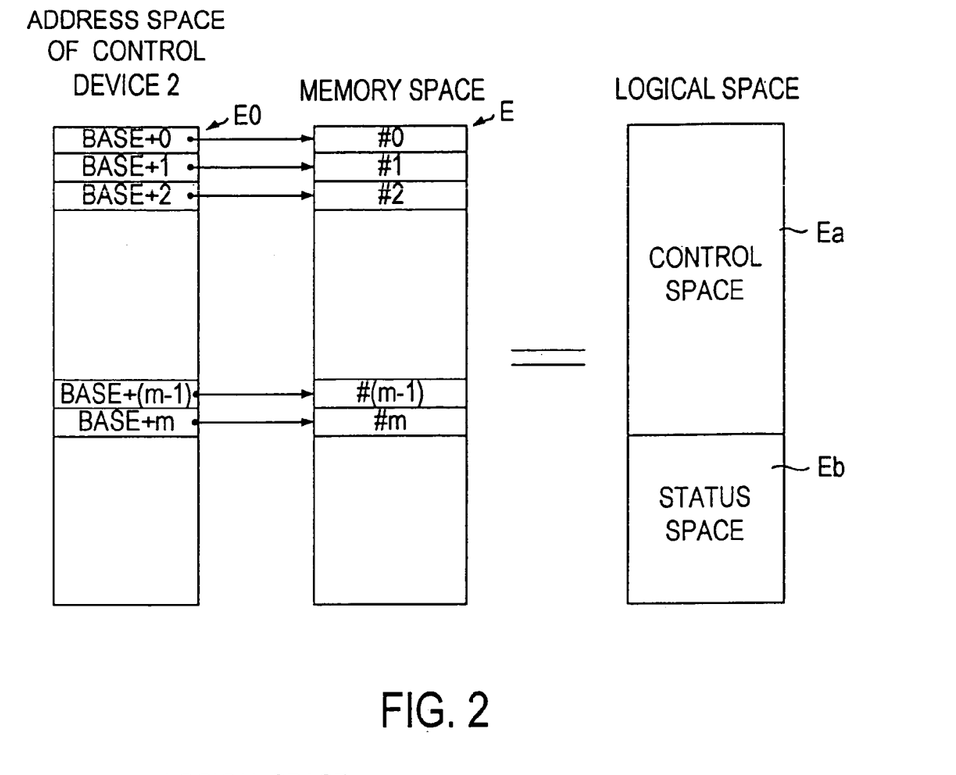
FIG. 2 illustrates a relationship between an address space of a control device 2 and a memory space of a communication device 1.
Figure 3:
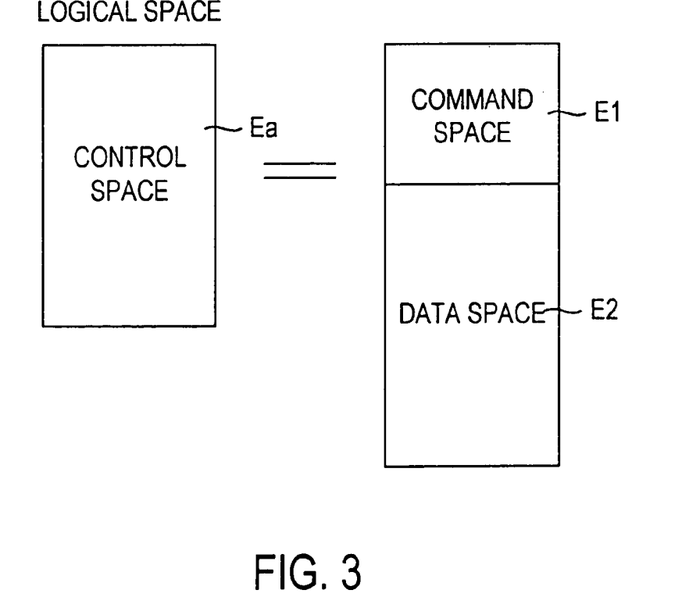
FIG. 3 depicts a relationship between a command space and a data space.
Figure 4:
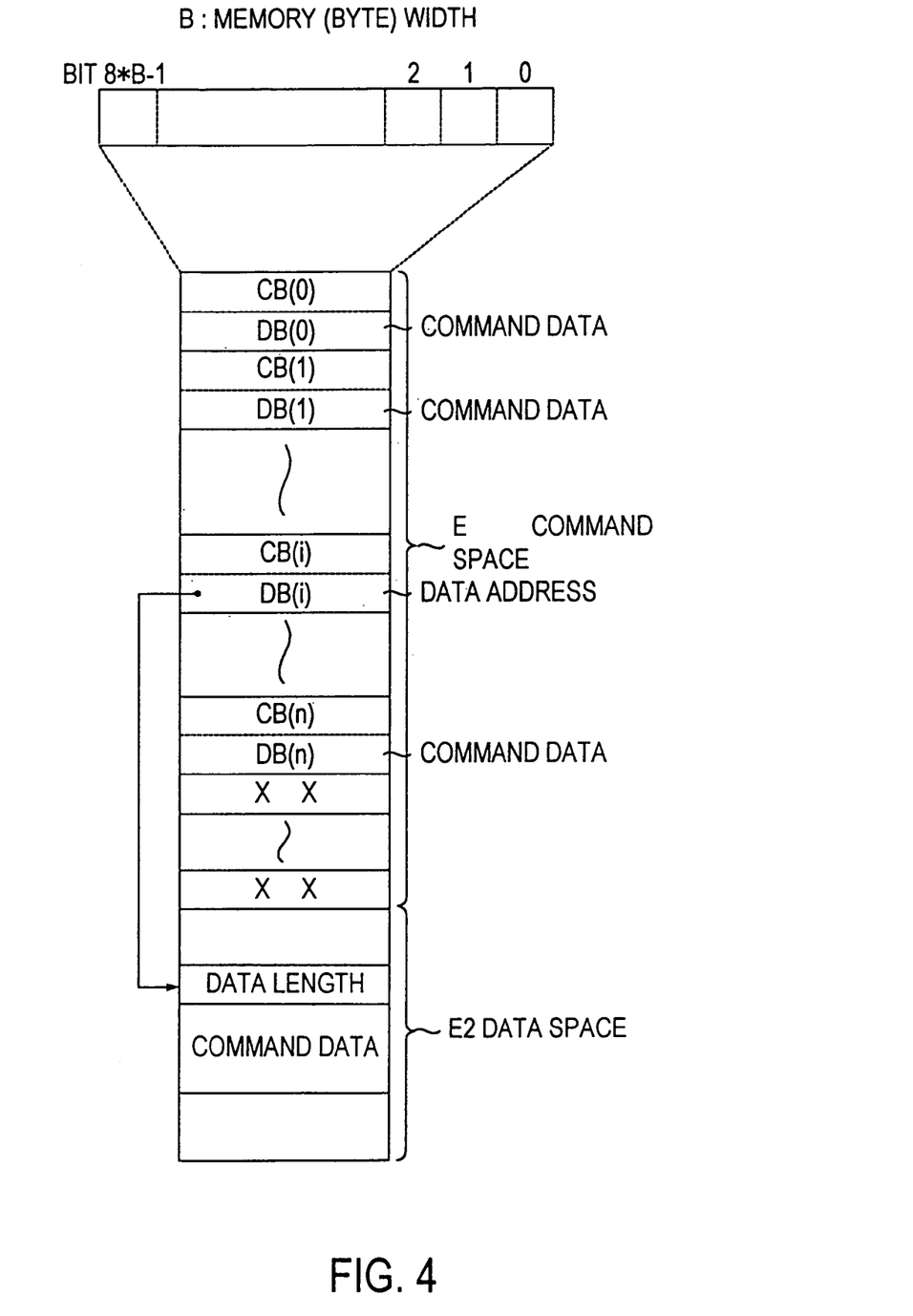
FIG. 4 illustrates a detailed structure of the command space and the data space.

Next, an explanation of the data structure stored in the memory 7 using reference FIGS. 2 to 4 follows.

FIG. 2 shows a relationship between an address space E0 in the control device 2 and a memory space E in the memory 7. In FIG. 2 addresses BASE+0 to BASE+m of control and status information sent out by the control device 2 can use the address space E0 in the control device 2 arbitrarily. As stated above, the control information is written to the control space Ea by the control device 2, and the status information is read from the status space Eb by the control device 2. The control space Ea and the status space Eb logically divide the memory space E, and it is possible for them to coexist together. Moreover, the control device 2 side can access the memory 7 as a memory space E that corresponds to an arbitrary address space E0.

FIG. 3 shows the command space E1 and the data space E2 which compose the control space Ea. Even though in FIG. 3 the control space Ea is comprised of the command space E1 and the data space E2, if data for a command is smaller than the width of the memory 7, data byte DB that composes the command space E1 is used instead of the data space E2.

As FIG. 4 shows the command space E1 is a space in which pairs of command bytes CB of the memory 7 width and data bytes DB of the memory 7 width are described consecutively. In other words, the command space E1 is a space in which the command bytes CB and the data bytes DB appear alternately Therefore, the control information composed of the command byte CB of the memory 7 width and the data byte DB of the memory 7 width is at least twice the width of the memory 7. For example, control information comprised of command byte CB(1) and data byte DB(1) is written to two memory 7 widths of the memory space E namely #2 and #3 corresponding to addresses BASE+2 and BASE+3 in the address space E0 respectively.

If the width of the memory 7 is B bits then the width of the command byte CB shall be 8*B bytes. Bit (8*B−1) of the command byte CB has information that indicates whether or not next control information exists. If this bit is a "1", it indicates that control information exists in a next byte in the memory space consecutively; else if it is a "0", it indicates that there is no control information existing in the next byte consecutively, which means that this control information is the last one in the control information set received. Bits (8*B−2), (8*B−3) contain information representing the command type; "00" indicating command type 0, and "01" indicating command type 1. The command type 0 shows that command data is smaller than or equal to B bytes, and that the command data itself is stored in the counterpart, data byte DB. The command type 1 shows that the command data is larger than B bytes and the counterpart data byte DB stores the address of the data space E2 which stores the command data, and functions as a pointer. The command type "10" or "11" is reserved for future extensions. Bits (8*B−4) to 0 show the command number itself and function as a (8*B−3) command identifier.

In case the command data is larger than B bytes, for instance, if the command data of a command byte CB(i) is (2*B) bytes, the address of the data space E2 which stores this (2*B) byte command data is expressed using B bytes as a data address in the data byte DB(i). This address shows the address which stores the data length of the command data in the data space E2. As for the command data in the data space E2, the data length of the command data is stored in its first byte. For example, if B is 1, and the data length is 2 bytes, then '00000010' is stored in the data length.

However, if the data byte DB has a large address value which cannot be expressed in (8*B) bits, then the control device 2 needs to decide upon an address-shift value in advance, and a virtual address formed, considering this fixed address-shift value, needs to be stored into the data byte DB. By using such a virtual address, large address values can be assigned. For example, if B is 1 and the real address is expressed as a 9 bit value, the virtual address that was formed by right-shifting by 1 bit beforehand, should be stored in the data byte DB, and this virtual address should be shifted to the left by 1 bit when the real address in the data space is sought. In consequence, large address values can be handled.

Similarly, large values can be realized for the data length in the data space E2 by converting them to virtual data lengths. For instance, if B is 1, and data length is expressed by 9 bits, a virtual data length formed beforehand by right-shifting by 1 bit could be stored as the data length, and this virtual data length could be shifted to the left by 1 bit to compute the real data length. As a consequence, large command data can be stored.

However, the above mentioned virtual address and virtual data length need to be supersets of the real address or real data length respectively. Because of using such margin-embedded virtual address and virtual data length, even though the memory is not fully utilized, yet the command byte CB and the data length can always be expressed within the width of the memory 7, and thus speedier reading of the memory 7 can be achieved.

The shift amounts of the aforementioned address and data length are set in the communication device 1 in advance, and the shift amount of the address and that of the data length can be set to either the same or different values.

Figure 5:
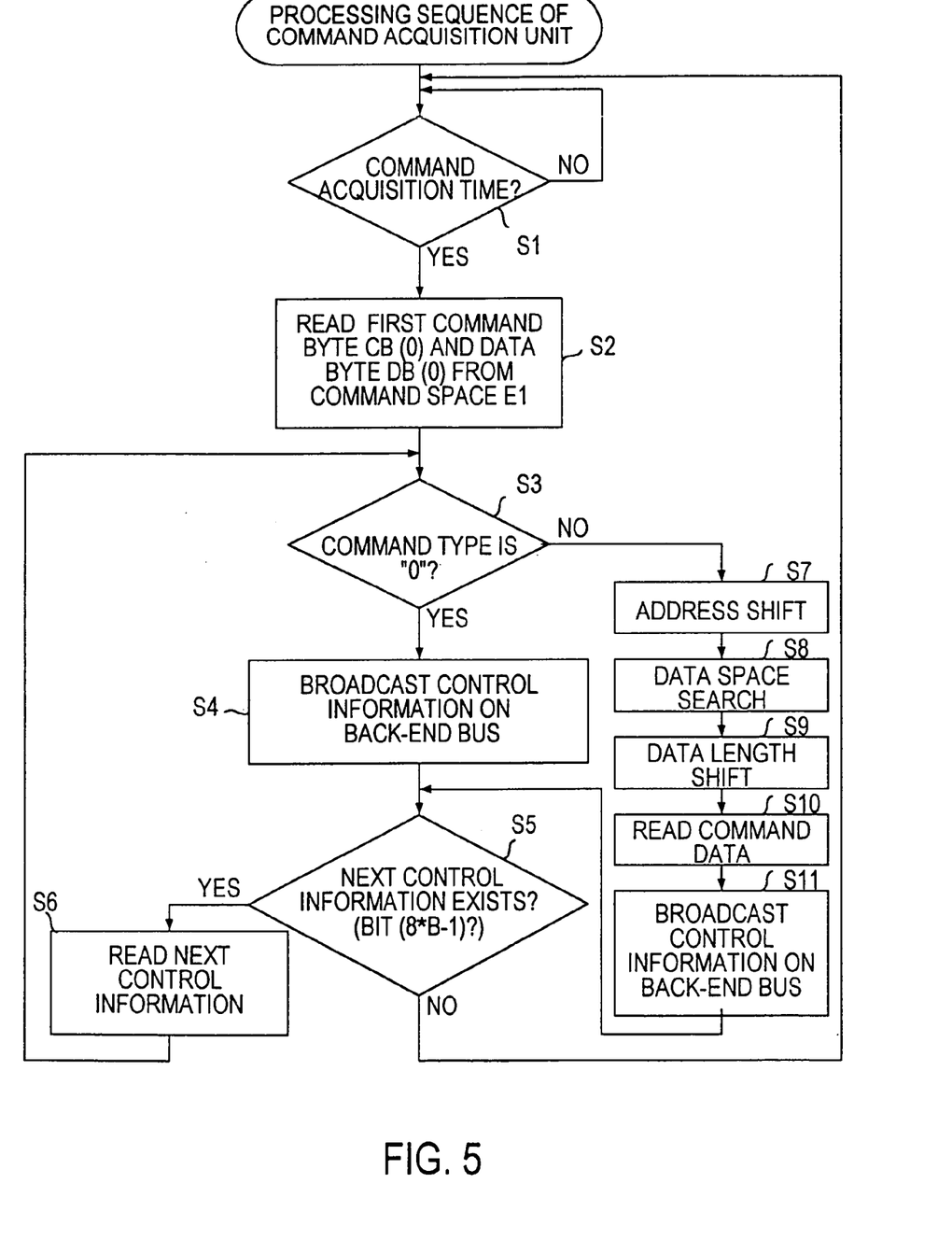
FIG. 5 shows a flow chart of processing sequence of a command acquisition unit 8.

Next, referring to the flow chart of FIG. 5, the processing sequence of the command acquisition unit 8 is explained.

In FIG. 5, first of all the command acquisition unit 8 checks whether it is a command acquisition time or not (step S1). This step is needed because the control device 2 and the communication protocol engine 5 share the memory 7, or in other words because it is necessary to separate the time when the control device 2 writes the control information and the time when the command acquisition unit 8 reads the control information (command acquisition time). Likewise, it is necessary to separate the writing and reading of the status information, but could be done in the same way as in case of the control information. The switching of the command acquisition time can be achieved using already known interrupt control or time division based control methods. When the interrupt control is employed, a changeover can be facilitated when an interrupt occurs at the end of each write or read process. On the other hand, when the time division based control is used, the control device 2 and the command acquisition unit 8 need to be synchronized. When this time division based control is used, the control device 2 must write the control information to the memory 7 each time, however if it does not have any control information, then a null command which is commonly known as a command with no function must be used. By using this null command, the control information can be defined as of the command type 0.

In any case, if it is determined as the command acquisition time in step S1, the command acquisition unit 8 reads the command byte CB and the data byte DB from the command space E1 (step S2) and then checks if the command type is "0" or "1" (step S3). If the command type is "0", the command data is expressed in the data byte DB, thus this command data is broadcasted on the back-end bus 12 along with the command number (step S4).

Subsequently, whether the next control information exists is checked referring to the value of bit (8*B−1) of the command byte CB (step S5). If bit (8*B−1) is "1" and thus the control information exists in the next byte, a move to step S3 is performed and the aforementioned steps from step S3 are repeated (step S6); if bit (8*B−1) is "0" and thus no control information exists in the next byte, a move to step S1 is performed and the aforementioned steps from step S1 are repeated.

On the other hand, if in step S3 the command type is determined to be "1", the value of the data byte DB is bit-shifted by an address-shift amount set in advance (step S7), and the control transfers to this shifted real address (step S8). Furthermore, the data length recorded in the byte at this real address is bit-shifted by a data length shift amount set in advance (step S9), the command data equaling this real data length is read (step S10), and at the same time this read command data along with the command number is broadcasted on the back-end bus 12 (step S11), a move to step S5 is performed and the aforementioned steps from step S5 are repeated.

In this fashion, the command acquisition unit 8 automatically reads out the control information regardless of a random order in which the control device 2 has stored it into the memory space, and broadcasts it to each detection unit 9-1 to 9-$m$ corresponding to each communication protocol module 10-1 to 10-$m$. This broadcasted control information is, as described above, sent to own communication protocol module and processes are implemented, only when each detection unit 9-1 to 9-$m$ detects that the control information is related to own communication protocol module corresponding to own detection unit.

Next, explained below is an example of a communication system having a communication device, as shown in FIG. 9, to which the idea of this invention is applied. Therein, a user control device 102 corresponds to the control device 2, a communication device 101 to the communication device 1, and a communication network 103, an audio processing device 104, a data processing device 105 and a video processing device 106 to the communication terminals 3-1 to 3-$n$. Furthermore, a user interface 102$a$ corresponds to the control device interface 4, a communication protocol engine 107 to the communication protocol engine 5, and an optical communication interface 103$a$, an audio interface 104$a$, a data interface 105$a$ and a video interface 106$a$ to the communication network interfaces 6-1 to 6-$n$. Therefore, the user interface 102$a$ contains the memory 7, the command acquisition unit 8, the back-end bus 12 and the detection units 9-1 to 9-$m$; and the communication protocol engine 107 contains the communication protocol management unit 11 and the communication protocol modules 10-1 to 10-$m$.

Other structural parts will be explained using the same numbering as shown in FIG. 9.

Figure 6:
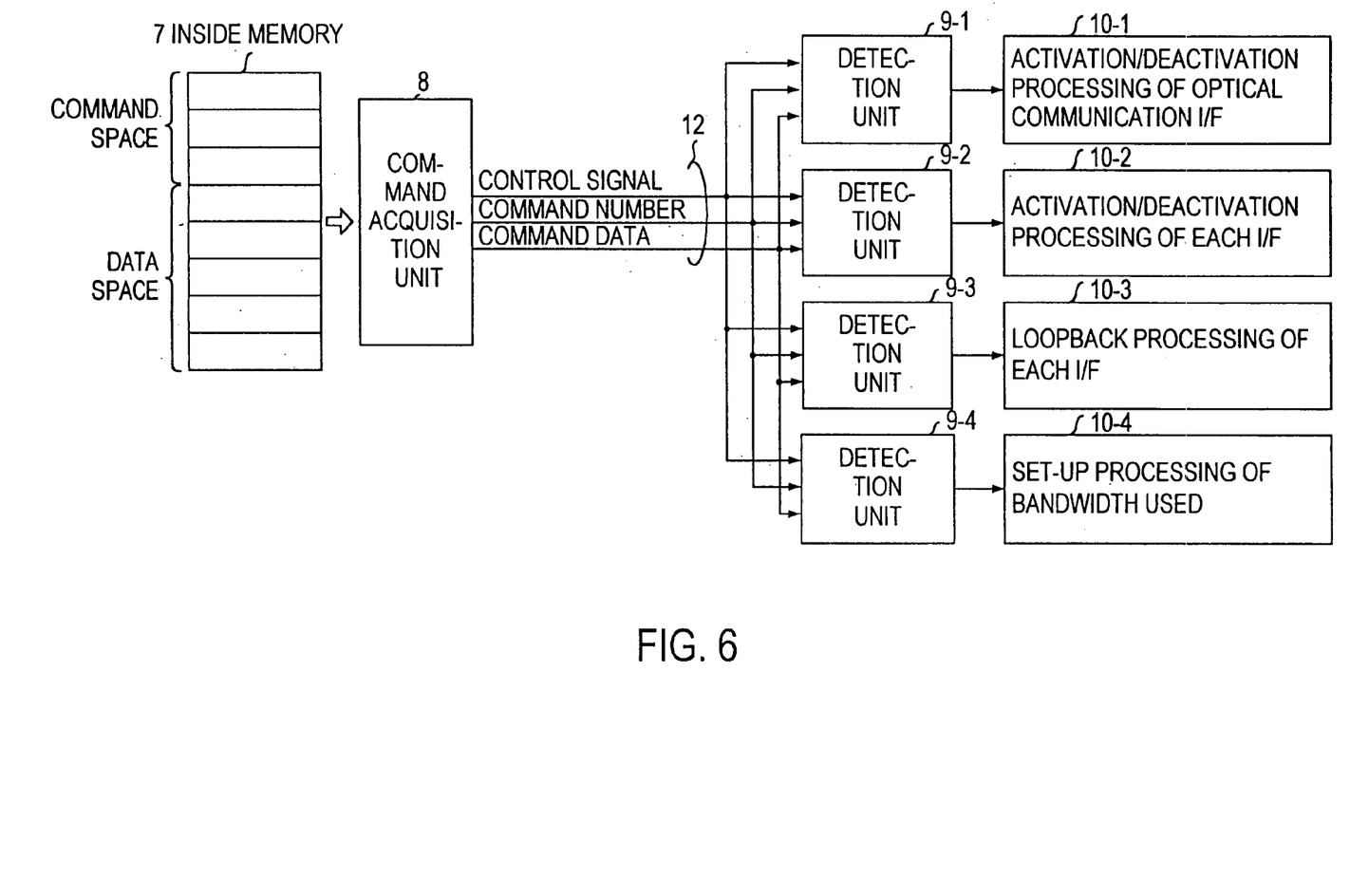
FIG. 6 illustrates a block diagram of processing of control information in the communication device employing the embodiment of this invention.

If a communication system ST of this invention is applied to the communication system 100 in FIG. 9, the implementation of a control information processing block in the communication device 1 of FIG. 1 shall be as shown in FIG. 6. In other words, FIG. 6, applying this invention, achieves the same function as of FIG. 10, the internal organization of the memory 7 is not fixed, and is just divided into the command space E1 and the data space E2. In FIG. 6, the four communication protocol modules 10-1 to 10-4 implement the same function as the communication protocol modules 107a to 107d in FIG. 10, implementing activation/deactivation processing of the optical communication interface 103a, activation/deactivation processing of each interface 104a to 106a, loopback processing of each interface 104a to 106a, and set-up processing of bandwidth used, respectively. Also the detection units 9-1 to 9-4 are set-up corresponding to the communication protocol modules 10-1 to 10-4 respectively. The command acquisition unit 8 broadcasts the control information obtained from the memory 7 to each detection unit 9-1 to 9-4 through the back-end bus 12. On the back-end bus 12, control signals indicating the control information, contents of the command byte CB, and of the data byte DB (includes data length if necessary) are broadcasted. Each detection unit 9-1 to 94 upon detecting a command meant for its corresponding communication protocol module 10-1 to 10-4 respectively, sends out the information necessary for processing by each communication protocol module 10-1 to 10-4 to each communication protocol module 10-1 to 10-4 for processing.

Now, the structure of the related command byte CB is explained. The control information comprises the above mentioned null command and four other commands corresponding to the communication protocol modules 10-1 to 10-4. For this explanation, the width B of the memory 7 is supposed to be one byte.

The null command is of command type "00" and command number "00000", the activation/deactivation command of the optical communication interface 103a is of command type "00" and command number "00001", the activation/deactivation command of each interface 104a to 106a is of command type "00" and command number "00010", the loopback command of each interface 104a to 106a is of command type "00" and the command number "00011", and control command for bandwidth used is of command type "01" and command number "00100". These command numbers are commonly used for the user control device 102's side.

The data byte DB of the null command is made up of all arbitrary bits.

The data byte DB for the activation/deactivation command of the optical communication interface 103a instructs activation when bit 0 is "1" and instructs deactivation when bit 0 is "0". All other bits are set up arbitrarily.

In case of the data byte DB for the activation/deactivation command of each of the interfaces 104a to 106a, the video interface 106a is the target of control when bit 7 is "1", the data interface 105a is the target of control when bit 6 is "1" and the audio interface 104a is the target of control when bit 5 is "1"; activation for each targeted interface is instructed when bit 0 is set to "1". All other bits are set up arbitrarily.

With regards to the data byte DB for the loopback command for each of the interfaces 104a to 106a, the video interface 106a is the target of control when bit 7 is "1", the data interface 105a is the target of control when bit 6 is "1", the audio interface 104a is the target of control when bit 5 is "1"; loopback processing for each targeted interface is instructed when bit 0 is set to "1".

For the data byte DB for the control command of the bandwidth used, address to store the command data is instructed, and the four-byte command data is stored at this instructed address in the data space. In the first byte, "00000011" representing a three-byte data length is stored, in the second byte, the data for the audio bandwidth used is stored, in the third byte, the data for the data bandwidth used is stored, and in the fourth byte, the data for the video bandwidth used is stored. In each byte, figures representing percentages of bandwidth used are indicated using upper four bits and lower four bits, and the total of bandwidth used of each byte should sum up to 100%. For example, if audio bandwidth used is 25%, it should be represented by "00100101".

Figure 7A:
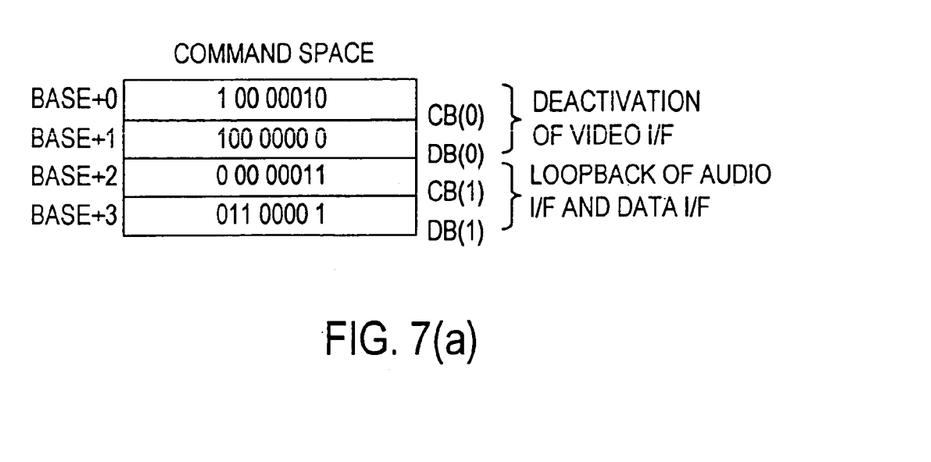

Now, for a more concrete explanation of the command space and the data space for control information, FIG. 7(a) shows the contents of the command space for the case when the video interface 106a is deactivated and loopback of the audio interface 104a and the data interface 105a is instructed.

In FIG. 7(a), "10000010" is written to the command byte CB0 and "10000000" is written to the data byte DB0 in the command space E1, which correspond respectively to BASE+0 and BASE+1 in the address space of the user control device 102. Bit 7 of the command byte CB0 is "1", which indicates that there is control information in the next byte. The command number of the command byte CB0 is "00010", which indicates the activation/deactivation command for each of the interfaces 104a to 106a. The fact that bit 7 of the data byte DB0 is a "1" indicates an activation/deactivation command for the video interface 106a, and the fact that bit 0 is a "0" indicates that the deactivation of the video interface 106a is instructed.

Furthermore, "00000011" is written to the command byte CB1 and "01100001" is written to the data byte DB1 in the command space E1, which correspond respectively to BASE+2 and BASE+3 in the address space. As bit 7 of the command byte CB1 is "0", it shows that no control information exists in the next byte and that this is the last control information. Also, the fact that the command number is "00011" indicates that this is a loopback processing command for each of the interfaces 104a to 106a. As both bit 6 and bit 5 of the data byte DB1 are "1", instructions for the data interface 105a and the audio interface 104a are indicated respectively, and as bit 0 is "1", it shows that this is a loopback instruction for the data interface 105a and the audio interface 104a.

Figure 7B:
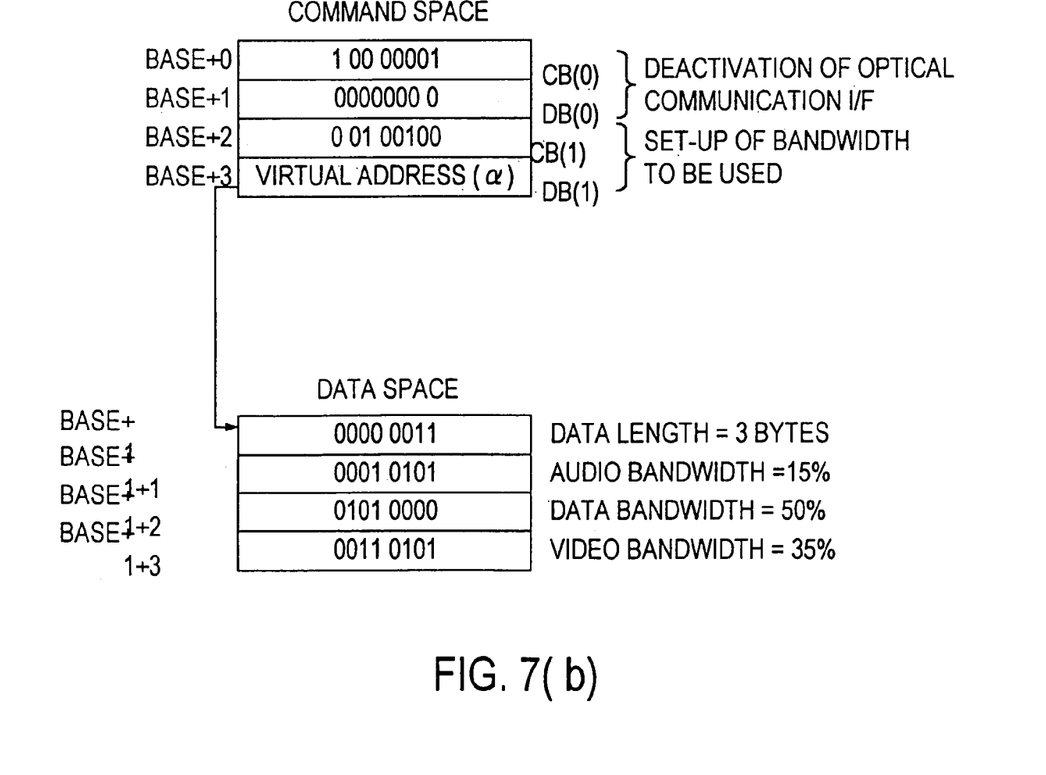

Similarly according to the address space in FIG. 7(b) deactivation is instructed using the activation/deactivation command for the optical communication interface 103a, and setting of each bandwidth used is instructed using the control command for the bandwidth used. Each bandwidth used is instructed using three bytes inside the data space E2; and an audio bandwidth to be set to 15%, a data bandwidth to be set to 50%, and a video bandwidth to be set to 35% is instructed. In the data byte DB1 the relative address value in the address space E2 is stored, right-shifted by 1 bit in advance, and this address value is converted to an address value shifted to the left by 1 bit during read. And all the bit values hidden due to shifting shall be set to "0".

Figure 8:
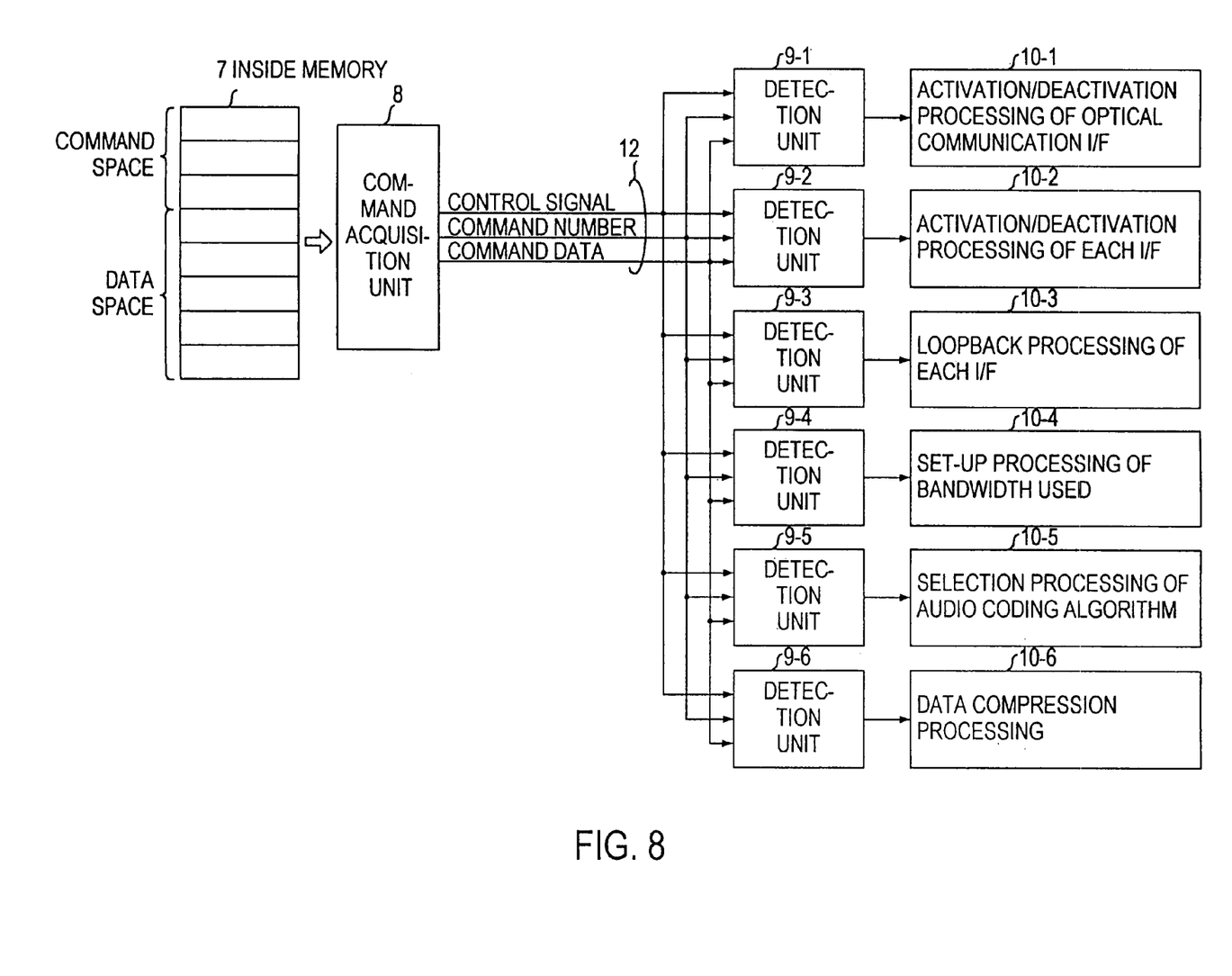
FIG. 8 shows a structure of the communication device in FIG. 6 after its design is changed.

Here, referring to FIG. 8, the structure in case of a design change, the same as shown in FIG. 11 is explained. In other words, the case in which the communication protocol module 10-5 for the selection processing of audio coding algorithm and the communication protocol module 10-6 for data compression processing are added, is explained. Each of the communication protocol modules 10-5 and 10-6 has detection units 9-5 and 9-6 respectively, same as the communication protocol modules 10-1 to 10-4. And each of the detection units 9-5 and 9-6 is commonly connected to the back-end bus 12. Thus, each detection unit 9-1 to 9-6 receives the control information broadcasted from the command acquisition unit 8, and if this control information is meant for own communication protocol module corresponding to own detection unit, the information needed for processing by own communication protocol module is sent to own communication protocol module for processing.

In this case, the user control device 102 sends the audio coding algorithm selection processing command or the data compression processing command to the communication device 101 by using just a common command and data byte format, thus there is no need to establish a relationship between the address space of the user control device 102 and the memory space inside the memory. Since the command acquisition unit 8 just reads the contents of the memory space sequentially and broadcasts them on the back-end bus 12, there is no need for design changes to the command acquisition unit 8. Moreover, since each of the communication protocol modules 10-1 to 10-6 performs processing irrelevant to the position of the address space, there is no need to modify any of the communication protocol modules 10-1 to 10-6 either. Therefore, it is possible to improve upon the functionality of communication control processing by simply adding the communication protocol modules 10-5 and 10-6, and their corresponding detection units 9-5 and 9-6, to implement a communication system with a general-purpose communication device.

If a communication protocol module corresponding to the control information acquired by the command acquisition unit 8 doesn't exist, each of the detection units 9-1 to 9-6 detects that the control information doesn't relate to their communication protocol modules, and the control information is not sent to each of the communication protocol modules 10-1 to 10-6, and no operation is executed for this control information. As a result, no malfunction is caused by instructions from erroneous control information, early prevention of breakdown can be achieved.

The implementation of this invention has the flexibility that even if the controlling device like the user control device which controls the communication device is replaced, the communication control processing can be correctly achieved just by inputting similar control information to the communication device. In this case, as mentioned above, if no communication protocol module to process the corresponding control information exists, the process of the communication protocol won't be executed.

INDUSTRIAL APPLICABILITY

This invention relates to a communication system which enables a remarkable reduction in time and labor required to modify a design of a communication device in accordance with a revision in a communication protocol. According to this invention, a position of control information in a memory is not fixed; control information acquisition means reads the control information from the memory and broadcasts it to each of detection means; if one or more detection means detect that the control information should be processed by own communication protocol module corresponding to own detection means, each of such detection means sends necessary information needed by each communication protocol module to each communication protocol module, thus each of the communication protocol modules implements processes, and so a communication device design can be modified by just addition or deletion of communication protocol modules, which is a merit of this invention.

Since the communication device design can be changed by just adding or deleting communication protocol modules, time and labor necessary for changes to design can be significantly reduced, which is also a merit of this invention.

Moreover, addresses of the control information in the control device don't need to correspond to memory locations in the communication device; when changes are implemented, change in the design of the control device is carried out just by adding or modifying commands and data corresponding to the added or modified communication protocol modules, to a group of commands and data which is transmittable from the control device to the communication device, which is a merit of this invention.

Since each of the communication protocol modules is designed to do communication protocol processing irrelevant to the memory space, there is no need to modify the design of the communication protocol modules such as address changes, as a result of the addition or deletion of communication protocol modules, which is a merit of this invention.

Moreover, reading out of control information and so on can be conducted quickly since control information made up of fixed unit of information are stored in the memory, which is a merit of this invention.

Also, since each of the communication protocol modules has its own detection means which only carries out processes corresponding to its communication protocol module, input or reception of erroneous control information doesn't cause malfunctions and thus early prevention of breakdown can be achieved, which is also a merit of this invention. Because of this, when changes or additions to the communication protocol are implemented, the development of the modification or addition to the communication protocol module and the modification or addition to the group of commands and data in the control device can be carried out separately, which is a merit of this invention.

I claim:

1. A communication system comprising a control device, a plurality of communication terminals, and a communication device which connects the control device with the plurality of communication terminals and has a plurality of communication protocol modules for controlling communications of the plurality of communication terminals based on control information from the control device, the communication device including:

a memory which temporarily stores the control information sent sequentially from the control device;

control information acquisition means which sequentially acquires the control information temporarily stored in the memory and broadcasts it to the one or more communication protocol modules;

a plurality of detection means each being provided in correspondence with each of the plurality of communication protocol modules at a front stage on an input side of each of the communication protocol modules for detecting whether the control information broadcasted by the control information acquisition means needs to be processed by the plurality of communication protocol modules;

the plurality of communication protocol modules implement processing of the control information if a corresponding one of the plurality of detection means detect that the control information is meant to be processed by a communication protocol module;

the memory having a control space for temporarily storing control information from the control device to the protocol modules and a status space for temporarily storing status information from the protocol modules to the control device;

the control device writes the control information into the control space of the memory and reads the status information from the status space of the memory;

the control information written to the control space includes a command number and command data; and the control device temporarily stores at least a pair of the command number and the command data in the memory sequentially.

2. A The communication system according to claim 1 characterized in that:

the control space is comprised of a command space which consists of pairs of the command number and the command data both made up of a fixed unit of information and a data space for temporarily storing the command data if the command data exceeds the fixed unit of information and a data space for temporarily storing the command data if the command data exceeds the fixed unit of information, and the control device, if the command data exceeds the fixed unit of information, writes information corresponding to an address within the data space where the command data is temporarily stored, instead of the command data that pairs with the command number, and also writes to a head of the command data stored in the data space information corresponding to a data length in the fixed unit of information, in which a content of the command data is temporarily stored.

3. A The communication system according to claim 2 characterized in that:

the information which corresponds to the address written in the fixed units of information and the information which corresponds to the data length, both are a virtual address or a virtual data length formed by shifting values by a fixed amount, and the control device processes the virtual address or the virtual data length as an address or a data length that was reverse shifted by a fixed amount.

4. A communication system comprising a control device, a plurality of communication terminals and a communication device which connects the control device with the plurality of communication terminals and has a plurality of communication protocol modules for controlling communications of the plurality of communication terminals based on control information from the control device;

the communication device including, a memory which receives the control information sent from the control device and stores the received control information sequentially and in parallel form;

control information acquisition means for sequentially acquiring from the memory the temporarily stored control information and broadcasting the control information to the plurality of communication protocol modules on a parallel bus;

a plurality of detection means each corresponding to an associated one of the plurality of communication protocol modules at a front stage on an input side of each of the communication protocol modules for detecting whether the control information broadcasted by the control information acquisition means needs to be processed by at least one of the communication protocol modules; and at least one of the communication protocol modules implements processing of the control information if a corresponding one of the detection means detect that the control information is meant to be processed by the corresponding communication protocol module.

5. A The communication system according to claim 4 characterized in that the control information acquisition means and the direction means corresponding to the communication protocol modules are connected through a parallel bus.

6. A The communication system according to claim 4 characterized in that each of the communication protocol modules are constructed and arranged for processing categories of the control information.

7. A The communication system according to claim 4 characterized in that:

the memory has a control space for temporarily storing control information from the control device to the protocol modules and a status space for the temporarily storing status information from the protocol modules to the control device, and the control device writes the control information into the control space of the memory and reads the status information from the status space of the memory.

8. The communication system according to claim 5 characterized in that each of the communication protocol modules is constructed and arranged for processing categories of the control information.

9. The communication system according to claim 5 characterized in that:

the memory has a control space for temporarily storing control information from the control device to the protocol modules and a status space for temporarily storing status information from the protocol modules to the control device, and the control device writes the control information into the control space of the memory and reads the status information from the status space of the memory.

10. The communication system according to claim 6 characterized in that:

the memory has a control space for temporarily storing control information from the control device to the protocol modules and a status space for temporarily storing status information from the protocol modules to the control device, and the control device writes the control information into the control space of the memory and reads the status information from the status space of the memory.

11. The communication system according to claim 4 characterized in that:

the control information written to the control space includes a command number and command data; and the control device temporarily stores at least a pair of the command number and the command data in the memory sequentially.

12. The communication system according to claim 11 characterized in that:

the control space is comprised of a command space which consists of pairs of the command number and the command data both made up of a fixed unit of information and a data space for temporarily storing the command data if the command data exceeds the fixed unit of information and a data space for temporarily storing the command data if the command data exceeds the fixed unit of information, and the control device, if the command data exceeds the fixed unit of information, writes information corresponding to an address within the data space where the command data is temporarily stored, instead of the command data that pairs with the command number, and also writes to a head of the command data stored in the data space information corresponding to a data length in the fixed unit of information, in which a content of the command data is temporarily stored.

13. The communication system according to claim 12 characterized in that:

the information which corresponds to the address written in the fixed units of information and the information which corresponds to the data length, both are a virtual address or a virtual data length formed by shifting values by a fixed amount, and the control device processes the virtual address or the virtual data length as an address or a data length that was reverse shifted by a fixed amount.

* * * * *